US008230487B2

(12) United States Patent
Feil

(10) Patent No.: US 8,230,487 B2
(45) Date of Patent: Jul. 24, 2012

(54) METHOD AND SYSTEM FOR CONTROLLING ACCESS TO A SECONDARY SYSTEM

(75) Inventor: Stephan Feil, Lobenfeld (DE)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 11/546,665

(22) Filed: Oct. 12, 2006

(65) Prior Publication Data

US 2007/0143597 A1    Jun. 21, 2007

(30) Foreign Application Priority Data

Dec. 21, 2005 (EP) .................................... 05112622

(51) Int. Cl.
  *H04L 29/06* (2006.01)
  *H04L 9/32* (2006.01)
  *H04L 9/20* (2006.01)
  *G06F 7/04* (2006.01)
  *G06F 17/30* (2006.01)
(52) U.S. Cl. ......... 726/5; 726/2; 726/3; 726/12; 726/26; 713/182; 713/183; 713/184; 380/44; 380/277
(58) Field of Classification Search .................. 726/2–3, 726/5, 12, 26; 713/182–184, 159; 380/44, 380/277
See application file for complete search history.

(56) References Cited

U.S. PATENT DOCUMENTS

| 4,238,853 | A | 12/1980 | Ehrsam et al. |
| 4,386,234 | A | 5/1983 | Ehrsam et al. |
| 4,604,686 | A | 8/1986 | Reiter et al. |
| 4,800,590 | A | 1/1989 | Vaughan |
| 4,935,961 | A | 6/1990 | Gargiulo et al. |
| 4,937,036 | A | 6/1990 | Beard et al. |
| 4,999,766 | A | 3/1991 | Peters et al. |
| 5,021,949 | A | 6/1991 | Morten et al. |
| 5,047,923 | A | 9/1991 | Elstner et al. |

(Continued)

FOREIGN PATENT DOCUMENTS

EP          0751453          1/1997

(Continued)

OTHER PUBLICATIONS

Schneier, "Applied Cryptography: Protocols, Algorithms, and Source Code in C", 1996, John Wiley & Sons, Inc., Second Edition, pp. 34-41, 174-175.*

(Continued)

*Primary Examiner* — Michael Simitoski
(74) *Attorney, Agent, or Firm* — Schmeiser, Olsen & Watts; John Pivnichny

(57) ABSTRACT

A method and system for controlling access of a user to a secondary system. The user is logged on a user system. A primary system connects the user system to the secondary system. A first authentication information is received from the user system. After determining that the first authentication information conforms to protected primary authentication data included in the primary system, access of the user to the primary system is provided followed by generation of a user-specific key from the first authentication information. Second authentication information is derived from protected secondary authentication data included in the primary system, by use of the user-specific key in conjunction with the protected secondary authentication data. The second authentication information is provided to the secondary system to enable access of the user to the secondary system.

23 Claims, 4 Drawing Sheets

U.S. PATENT DOCUMENTS

| | | | |
|---|---|---|---|
| 5,048,085 A | 9/1991 | Abraham et al. | |
| 5,103,478 A | 4/1992 | Matyas et al. | |
| 5,148,481 A | 9/1992 | Abraham et al. | |
| 5,226,172 A | 7/1993 | Seymour et al. | |
| 5,241,594 A | 8/1993 | Kung | |
| 5,329,619 A | 7/1994 | Page et al. | |
| 5,347,632 A | 9/1994 | Filepp et al. | |
| 5,369,778 A | 11/1994 | San Soucie et al. | |
| 5,434,918 A | 7/1995 | Kung et al. | |
| 5,442,342 A | 8/1995 | Kung | |
| 5,442,771 A | 8/1995 | Filepp et al. | |
| 5,513,263 A | 4/1996 | White et al. | |
| 5,564,043 A | 10/1996 | Siefert | |
| 5,579,479 A | 11/1996 | Plum | |
| 5,586,260 A * | 12/1996 | Hu | 726/12 |
| 5,590,199 A | 12/1996 | Krajewski, Jr. et al. | |
| 5,594,910 A | 1/1997 | Filepp et al. | |
| 5,655,077 A | 8/1997 | Jones et al. | |
| 5,684,950 A | 11/1997 | Dare et al. | |
| 5,689,708 A | 11/1997 | Regnier et al. | |
| 5,715,393 A | 2/1998 | Naugle | |
| 5,768,504 A | 6/1998 | Kells et al. | |
| 5,781,724 A | 7/1998 | Nevarez et al. | |
| 5,864,665 A | 1/1999 | Tran | |
| 5,933,604 A | 8/1999 | Inakoshi | |
| 5,935,251 A | 8/1999 | Moore | |
| 5,944,824 A | 8/1999 | He | |
| 5,946,397 A | 8/1999 | M'Raihi et al. | |
| 5,948,064 A | 9/1999 | Bertram et al. | |
| 5,956,407 A | 9/1999 | Slavin | |
| 5,974,463 A | 10/1999 | Warrier et al. | |
| 5,996,076 A | 11/1999 | Rowney et al. | |
| 6,000,033 A | 12/1999 | Kelley et al. | |
| 6,006,333 A * | 12/1999 | Nielsen | 726/8 |
| 6,009,177 A | 12/1999 | Sudia | |
| 6,035,402 A | 3/2000 | Vaeth et al. | |
| 6,041,362 A | 3/2000 | Mears et al. | |
| 6,044,349 A | 3/2000 | Tolopka et al. | |
| 6,052,785 A * | 4/2000 | Lin et al. | 726/5 |
| 6,067,623 A * | 5/2000 | Blakley et al. | 726/5 |
| 6,088,451 A | 7/2000 | He et al. | |
| 6,178,511 B1 | 1/2001 | Cohen et al. | |
| 6,199,077 B1 * | 3/2001 | Inala et al. | 715/201 |
| 6,205,480 B1 * | 3/2001 | Broadhurst et al. | 709/225 |
| 6,240,512 B1 | 5/2001 | Fang et al. | |
| 6,243,816 B1 | 6/2001 | Fang et al. | |
| 6,263,446 B1 * | 7/2001 | Kausik et al. | 726/5 |
| 6,275,944 B1 | 8/2001 | Kao et al. | |
| 6,606,663 B1 * | 8/2003 | Liao et al. | 709/229 |
| 6,934,706 B1 * | 8/2005 | Mancuso et al. | 1/1 |
| 7,039,714 B1 * | 5/2006 | Blakley, III et al. | 709/229 |
| 7,069,433 B1 * | 6/2006 | Henry et al. | 713/151 |
| 7,137,006 B1 * | 11/2006 | Grandcolas et al. | 713/180 |
| 2001/0005887 A1 * | 6/2001 | Boroditsky et al. | 713/183 |
| 2001/0047335 A1 * | 11/2001 | Arndt et al. | 705/44 |
| 2002/0178366 A1 * | 11/2002 | Ofir | 713/182 |
| 2003/0065940 A1 * | 4/2003 | Brezak et al. | 713/201 |
| 2003/0204732 A1 * | 10/2003 | Audebert et al. | 713/182 |
| 2004/0098595 A1 * | 5/2004 | Aupperle et al. | 713/185 |
| 2004/0250118 A1 * | 12/2004 | Andreev et al. | 713/201 |
| 2005/0004837 A1 * | 1/2005 | Sweeney et al. | 705/14 |
| 2005/0005094 A1 * | 1/2005 | Jamieson et al. | 713/155 |
| 2005/0154887 A1 * | 7/2005 | Birk et al. | 713/168 |
| 2005/0171863 A1 * | 8/2005 | Hagen | 705/26 |
| 2006/0075475 A1 * | 4/2006 | Boulos et al. | 726/6 |
| 2006/0080731 A1 * | 4/2006 | Zhang et al. | 726/8 |
| 2007/0220062 A1 * | 9/2007 | Carberry et al. | 707/201 |

FOREIGN PATENT DOCUMENTS

| | | |
|---|---|---|
| EP | 1035462 A1 | 9/2000 |
| GB | 2281645 | 3/1995 |
| GB | 2399435 A | 9/2004 |
| WO | WO0067415 A2 | 11/2000 |

OTHER PUBLICATIONS

Menezes et al. Handbook of Applied Cryptography, 1997 CRC Press, pp. 388-390.*

Menezes, Alfred J. et al. Handbook of Applied Cryptography, 1997 CRC Press, pp. 397-405.*

Menezes et al.; Handbook of Applied Cryptography, 1996, Section 13.22, pp. 559-560.

Schneier, Bruce; Applied Cryptography, Second Edition; Wiley Computer Publishing, John Wiley & Sons, Inc.; 1996; pp. 51-52.

Vacca, John R.; Sign On to Streamlined Security; Journal: Datamation, v40 n18, Sep. 15, 1994, pp. 65-67.

Staff Writer, Computer Business Review; Memco Software Tries Again with Automated Single Sign-on, May 28, 1997, 6 pages, http://www.cbronline.com/news/memco_software_tries_again_with_automated_single_sign_on_1...; retrieved from the Internet Jan. 19, 2012.

Ogden, W. R.; Temporary Global Passwords; IBM Technical Disclosure Bulletin; vol. 36, No. 3, Mar. 1993, pp. 451-454.

Arnold, et al.; Logon Assist for Multiple Logons; IBM Technical Disclosure Bulletin; vol. 32, No. 8A, Jan. 1990, pp. 303-305.

Banning, et al.; Network Signon Coordination Configuration; IBM Technical Disclosure Bulletin; vol. 36, No. 12, Dec. 1993, pp. 389-396.

* cited by examiner

| User name | Primary authentication information | Secondary authentication information for A, B, C |
|---|---|---|
| Frank A | H_a(my99sec) | E(H_b(my99sec))(mypass)<br>E(H_b(my99sec))(0607)<br>E(H_b(my99sec))(frank99) |
| Ann B | H_a(ysxjik) | E(H_b(ysxjik))(asdl)<br>E(H_b(ysxjik))(m&m)<br>E(H_b(ysxjik))(summer05) |
| Nicole C | H_a(nic8ole) | E(H_b(nic8ole))(n1ccy)<br>E(H_b(nic8ole))(mace04)<br>E(H_b(nic8ole))(imhoidbi) |

METHOD AND SYSTEM FOR CONTROLLING ACCESS TO A SECONDARY SYSTEM

FIELD OF THE INVENTION

The invention relates to a method and a data processing system for controlling the access of a user to a secondary system.

BACKGROUND OF THE INVENTION

A typical scenario in modern day computing is a user who is logged in to a primary system from a user system and who wants to log in to a secondary system from the primary system. Unfortunately, current methods in the related art for controlling access of a user to a secondary system have security risks, and administrators (e.g., system administrators) may be subject to suspicion when security-related incidents occur.

Thus, there is therefore the need for an improved method and system for controlling the access of a user to a secondary system, wherein the improved method and system alleviates and/or mitigates the aforementioned difficulties associated with current methods in the related art for controlling access of a user to a secondary system.

SUMMARY OF THE INVENTION

The present invention provides a method for controlling access of a user to a secondary system, said user being logged on a user system, a primary system connecting the user system to the secondary system, said method comprising:

receiving first authentication information from the user system;

determining that the first authentication information conforms to protected primary authentication data comprised by the primary system, followed by providing access of the user to the primary system;

after providing access of the user to the primary system, generating a user-specific key from the first authentication information;

deriving second authentication information from protected secondary authentication data comprised by the primary system, said deriving the second authentication information comprising using the user-specific key in conjunction with the protected secondary authentication data; and providing the second authentication information to the secondary system to enable access of the user to the secondary system, wherein said receiving first authentication information, said determining and providing access, said deriving the second authentication information, and said providing the second authentication information to the secondary system are performed by the primary system.

The present invention provides a computer program product comprising computer executable instructions for performing a method for controlling access of a user to a secondary system, said user being logged on a user system, a primary system connecting the user system to the secondary system, said method comprising:

receiving first authentication information from the user system;

determining that the first authentication information conforms to protected primary authentication data comprised by the primary system, followed by providing access of the user to the primary system;

after providing access of the user to the primary system, generating a user-specific key from the first authentication information;

deriving second authentication information from protected secondary authentication data comprised by the primary system, said deriving the second authentication information comprising using the user-specific key in conjunction with the protected secondary authentication data; and providing the second authentication information to the secondary system to enable access of the user to the secondary system, wherein said receiving first authentication information, said determining and providing access, said deriving the second authentication information, and said providing the second authentication information to the secondary system are performed by the primary system.

The present invention provides a primary system comprising a processor and a computer program product, said computer program product comprising computer executable instructions that when executed by the processor perform a method for controlling access of a user to a secondary system when the user is logged on a user system subject to the primary system connecting the user system to the secondary system, said method comprising:

receiving first authentication information from the user system;

determining that the first authentication information conforms to protected primary authentication data comprised by the primary system, followed by providing access of the user to the primary system;

after providing access of the user to the primary system, generating a user-specific key from the first authentication information;

deriving second authentication information from protected secondary authentication data comprised by the primary system, said deriving the second authentication information comprising using the user-specific key in conjunction with the protected secondary authentication data; and providing the second authentication information to the secondary system to enable access of the user to the secondary system.

The present invention provides an improved method and system for controlling the access of a user to a secondary system, wherein the improved method and system alleviates and/or mitigates difficulties associated with current methods in the related art for controlling access of a user to a secondary system.

DETAILED DESCRIPTION OF THE INVENTION

Figure 1:
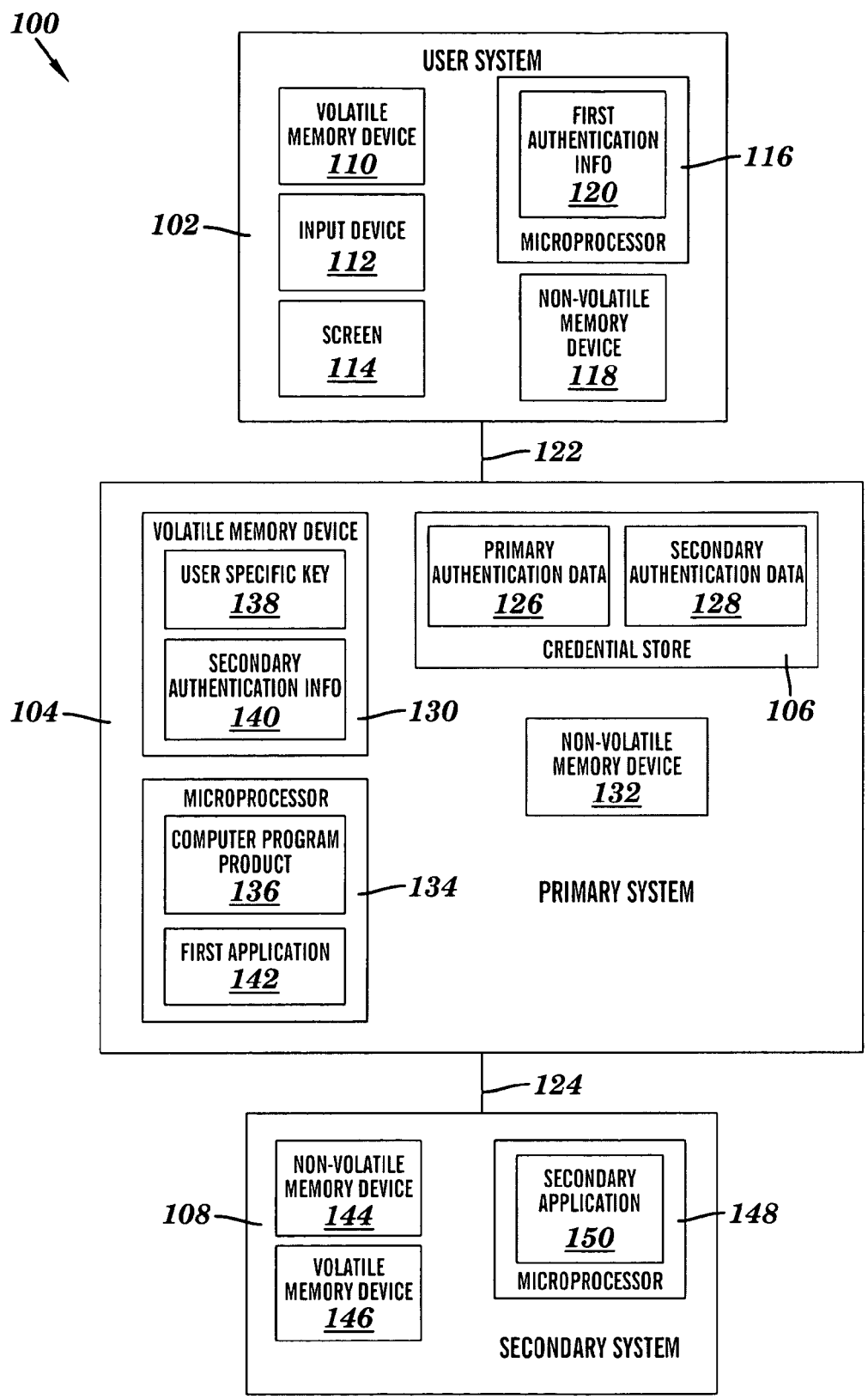
FIG. 1 is a block diagram of a computer network, in accordance with embodiments of the present invention.

In accordance with an embodiment of the present invention, there is provided a method for controlling the access of a user to a secondary system, wherein the user is logged on a user system, wherein the secondary system and the user system are interconnected by a primary system, wherein the primary system comprises a credential store, wherein the credential store comprises protected primary authentication data and protected secondary authentication data and wherein the method comprises the step of receiving first authentication information from the user for the primary system and the step of comparing the first authentication information with the protected primary authentication data so that access is provided for the user to the primary system if the first authentication information conforms to the protected primary authentication data. The method further comprises the step of generating a user-specific key from the first authentication information and the step of deriving a second authentication information by decryption of the protected secondary authentication data by use of the user-specific key. The second authentication information is provided to the secondary system to enable access by the user to the secondary system.

There is therefore no single key which is used to encrypt the authentication information of all users. Instead, there is a user-specific key which is generated during a session by use of the first authentication information. The user-specific key is used to decrypt the second authentication data and thereby deriving a second authentication information. Since there is no general key for decrypting the authentication data of all users, the attractiveness of breaking such an general key has vanished. Neither the system administrator nor the database administrator nor any other administrator of a computer system that comprises the credential store has access to such a general key since such a general key does not exist. As a consequence, the protection of the various administrators against false suspicion is raised enormously. Even having access to the secondary session data, the system administrator can only compromise user-specific keys that are currently in use. This narrows down the cases in which false suspicion can arise, in particular when combined with other typical methods (e.g. tracking administrative access). In particular, the benefits from having no single key for the credential store becomes apparent. This way also auditability is supported. Since the credential database contains differently encrypted data, attacking is much more difficult. Also known plain text attacks are ruled out.

In accordance with an embodiment of the present invention, the user-specific key is stored during a session of the user on the primary system and the secondary authentication information is only generated and provided to the secondary system during the session in which the user requests access to the secondary system. Thus the second authentication information is only available during a session if the user uses the secondary system. As a consequence, the time when a system administrator has access to the second authentication information is cut down to the time when the user is logged on the secondary system. This narrows down the cases in which false suspicion can arise against the system administrator.

In accordance with an embodiment of the present invention, the method comprises the step of deleting the user-specific key when the user logs off from the primary system. Any user-specific data which is required for accessing the secondary system is only stored during a session on the primary system. This lowers the risk of making available the secondary authentication information to anybody else than the user. In addition to the user-specific key, the secondary authentication information is also deleted when the user logs off from the primary system.

In accordance with an embodiment of the present invention, the method comprises the step of requesting a second secondary authentication information from the user if the stored protected secondary authentication data is not valid or not available and the step of generating a second protected secondary authentication data by two way encryption of the second secondary authentication information by use of the user-specific key. The method further comprises the step of replacing said invalid or unavailable protected secondary authentication data by the second protected secondary authentication data.

In accordance with an embodiment of the present invention, the method comprises the steps of receiving a request from the user after the user has accessed the primary system and in which the user requests a change of the protected primary authentication data. In response to the request a second primary authentication information is requested from the user. The second primary authentication information is transformed into a second protected primary authentication data which replaces the protected primary authentication data. The method further comprises the step of generating a second secondary authentication data by two way encrypting the secondary authentication information by use of the second primary authentication information in the step of replacing the secondary authentication data by the second secondary authentication data. Thus the method provides steps for enabling a user to change the primary authentication information. It is also ensured that the secondary authentication data reflects the change of the primary authentication information. A user is free to change primary authentication information. This ensures that the security risks are kept low.

In accordance with an embodiment of the present invention, the first authentication information is a user-specific password which is one way encrypted with a first encryption method and then compared with the protected primary authentication data. Moreover the user-specific key is generated by one way encryption of the password with a second encryption method.

In accordance with an embodiment of the present invention, the first encryption method and the second encryption method are provided by two different hash functions.

In accordance with an embodiment of the present invention, the first authentication information is a user-specific private key which is applied on user-specific data. The result of the application of the user-specific private key on the user-specific data is compared with the primary authentication data by use of a public key. The public key is stored in the credential store and the user-specific key is generated by applying the user-specific private key to the user-specific data.

In another aspect the invention relates to a computer program product comprising computer executable instructions for performing a method in accordance with the present invention.

In another aspect, the present invention relates to a data processing system for controlling the access of a user to a secondary system for a user. The user is logged on a user system and the secondary system and the user system are interconnected by a primary system. The primary system comprises a credential store and the credential store comprises protected primary authentication data and protected secondary authentication data. The data processing system comprises means for receiving a first authentication information from the user for the primary system and means for comparing the first authentication information with the protected primary authentication data. The data processing system further comprises means for generating a user-specific key from the first authentication information and means for generating a second authentication information by decryption of the protected secondary authentication data by use of the user-specific key and further means for providing the second authentication information to the secondary system.

FIG. 1 shows a block diagram of a computer network 100, in accordance with embodiments of the present invention. The network 100 comprises a user system 102, a primary system 104, and a secondary system 108. The user system 102 is connected to the primary system 104 via the network connection 122, and the primary system 104 is connected to the secondary system 108 via the network connection 124. The user system 102 comprises a volatile memory device 110, an input device 112, a screen 114, a microprocessor 116, and a non-volatile memory device 118.

The primary system 104 comprises a credential store 106, a volatile memory device 130, a non-volatile memory device 132, and a microprocessor 134. The volatile memory device 130 comprises a user-specific key 138 and secondary authentication information 140. The credential store 106 comprises primary authentication data 126 and secondary authentication data 128. The microprocessor 134 comprises a computer program product 136 and a first application 142.

The secondary system 108 comprises a non-volatile memory device 144, a volatile memory device 146 and a microprocessor 148.

A user is logged on the user system and starts a session by providing a first authentication information 120 to the primary system 104. The first authentication information 120 is derived from user-specific authentication data such as a password or private key of the user. The user-specific authentication data (e.g., password or private key) may be provided by the user by use of the input device 112 to the user system 102. In one embodiment, the first authentication information 120 is neither stored on the volatile memory device 110 nor on the non-volatile memory device 118. The first authentication information 120 is generated from the user-specific authentication data via processing the user-specific authentication data by the microprocessor 116. The first authentication information 120 is provided by the network connection 122 to the primary system 104. The network connection 122 may be a protected communication channel. For protection of the communication channel, standard technologies such as SSL (Secure Socket Layer) or VPN (Virtual Private Network) can be used.

The first authentication information 120 is received by the primary system 104. The microprocessor 134 executes the computer program product 136 which comprises instructions for performing the method in accordance with the present invention. The credential store 106 comprises protected primary authentication data 126. The microprocessor 134 compares the first authentication information 120 with the primary authentication data 126 in the following ways.

If the first authentication information 120 is a password, then the password is sent to the primary system as the first authentication information 120 and thereafter is one way encrypted by the primary system 104 with a first encryption method and the one way encrypted password is the processed first authentication information 120 that is compared with the protected primary authentication data 126. If the first authentication information 120 is a password, then the first authentication data 120 is considered to conform to the protected primary authentication data 126 if the one way encrypted password is equal to the protected primary authentication data 126.

One way encryption is characterized by the fact that encrypted data cannot be decrypted; the encrypted data is used only for comparison with other encrypted data. In contrast, two way encryption is characterized by the fact that data can be encrypted and decrypted at some later point in time.

If the first authentication information 120 is derived from a private key applied on a random string such that the random string is derived from user-specific data pertaining to the user, then the random string is sent by the primary system 104 to the user system 102. Applying the private key on the user-specific data (e.g., random string) means using the private key to encrypt the user-specific data (e.g., random string). The private key is applied to the random string by the user system 102 and then sent back to the primary system 104 as the processed first authentication data 120. The processed first authentication information 120, which is the private key applied on the random string, is compared by the computer program product 136 with the primary authentication data 126 by use of a public key that is associated with the private key. The public key is used to decrypt the first authentication data 120. Comparing the first authentication data 120 with the primary authentication data 126 by use of a public key means that the data resulting from decrypting the first authentication data 120 through use of the public key is compared with the primary authentication data 126. Thus if the first authentication information 120 is a private key applied on user-specific data (e.g., random string), then the first authentication data 120 is considered to conform to the protected authentication data 126 if the data resulting from decrypting the first authentication data 120 through use of the public key is equal to the protected authentication data 126.

If the first authentication information 120 conforms to the protected authentication data 126, then the user can access the primary system. The user can then use a first application 142 which is executed by the microprocessor 134 on the primary system 104. The first application 142 is for example a portal. If the first authentication information 120 does not conform to the protected authentication data 126, then the user is rejected.

From the first authentication information 120, a user-specific key 138 is generated by use of the computer program product 136 and stored on the volatile memory device 130. If the first authentication information 120 is a password, then the user-specific key 138 is generated by one way encryption of the password with the second encryption method which differs from the first encryption method. If the first authentication information 120 is derived from a private key, then the private key is applied at the user system 102 to a random string derived from user dependent data. The random string derived from user dependent data is provided to the user system 102 by the primary system 104. The value computed from applying the private key to the random string is sent by the user system 102 to the primary system 104 becomes the user-specific key 138.

The user might want to access the secondary system 108 from the primary system 104. Such a situation arises for example when the first application 142 comprises a portal through which applications on the secondary system 108 are accessed. For accessing the secondary system 108, a second authentication information 140 is derived and stored on the volatile memory device 130 by decryption of the protected secondary authentication data 128 by use of the user-specific key applied to the secondary authentication data 128, or alternatively by two way encryption of the protected secondary authentication data by use of the user-specific key applied to the secondary authentication data 128 as discussed infra in conjunction with the illustrated example of FIG. 4. The secondary authentication information 140 is provided via the network connection 124, which is also a protected communication channel, to the secondary system 108, so that the user is logged on the secondary system. The user can now use the second application 150 executed by the microprocessor 148 of the secondary system 108 via the primary system 104 from the user system 102.

The secondary authentication information 140 can be generated as described above when the user requests access to the secondary system 108. Alternatively the secondary authentication information 140 can be generated when the user logs onto the primary system 104 and stored on the volatile memory device 130 or alternatively on the non-volatile memory device 132. However, when the user ends his session, the secondary authentication information 140 and the user-specific key 138 are deleted from the volatile memory device 130 or from the non-volatile memory device 132.

The primary authentication data 126 and the secondary authentication data 128 are established through the following process. Initially the system administrator sets the primary authentication data 126. If the user accesses the secondary system 108 via the primary system 104 and no secondary authentication data 128 is stored (or is not valid), the computer program product 136 prompts the user in order to demand secondary authentication information, from which the secondary authentication data 128 is generated by encrypting the second authentication information provided by the user. Alternatively, the second authentication data 128 can be provided by the system administrator when setting the primary authentication data 126.

The primary authentication data 126 may be changed by the following procedure: if the user is logged on the primary system and requests a change of the primary authentication data 126. The user is prompted for a new first authentication information. Since at this point the primary system 104 has both the current first authentication information 120 and the new first authentication information, the computer program product 136 decrypts all the stored secondary information data 128 using the first authentication information 120 and encrypts it afterwards with the new first authentication information which is then replacing the second information data in the credential store 106.

The primary authentication data 126 may be changed by the following alternative procedure. A second primary authentication information is requested and received from the user. The obtained second primary authentication information is transformed into a second protected primary authentication data which replaces the protected primary authentication data. A second secondary authentication data is generated by two-way encrypting the secondary authentication information 128 by use of the obtained second primary authentication information. The generated second secondary authentication data replaces the secondary authentication data 128.

When authentication of the user to the secondary system 108 is not successful, the user is notified and prompted for updating the secondary authentication data 128. If the user provides secondary authentication information 140, then the secondary authentication information 140 is encrypted from which the secondary authentication data 128 is generated.

If the stored protected secondary authentication data 128 is not valid or not available, the following procedure may be used. Second secondary authentication information is requested and received from the user. A second protected secondary authentication data is generated by two-way encryption of the obtained second secondary authentication information by use of the user-specific key 138. The invalid or unavailable protected secondary authentication data 128 is replaced by the generated second protected secondary authentication data.

Figure 2:
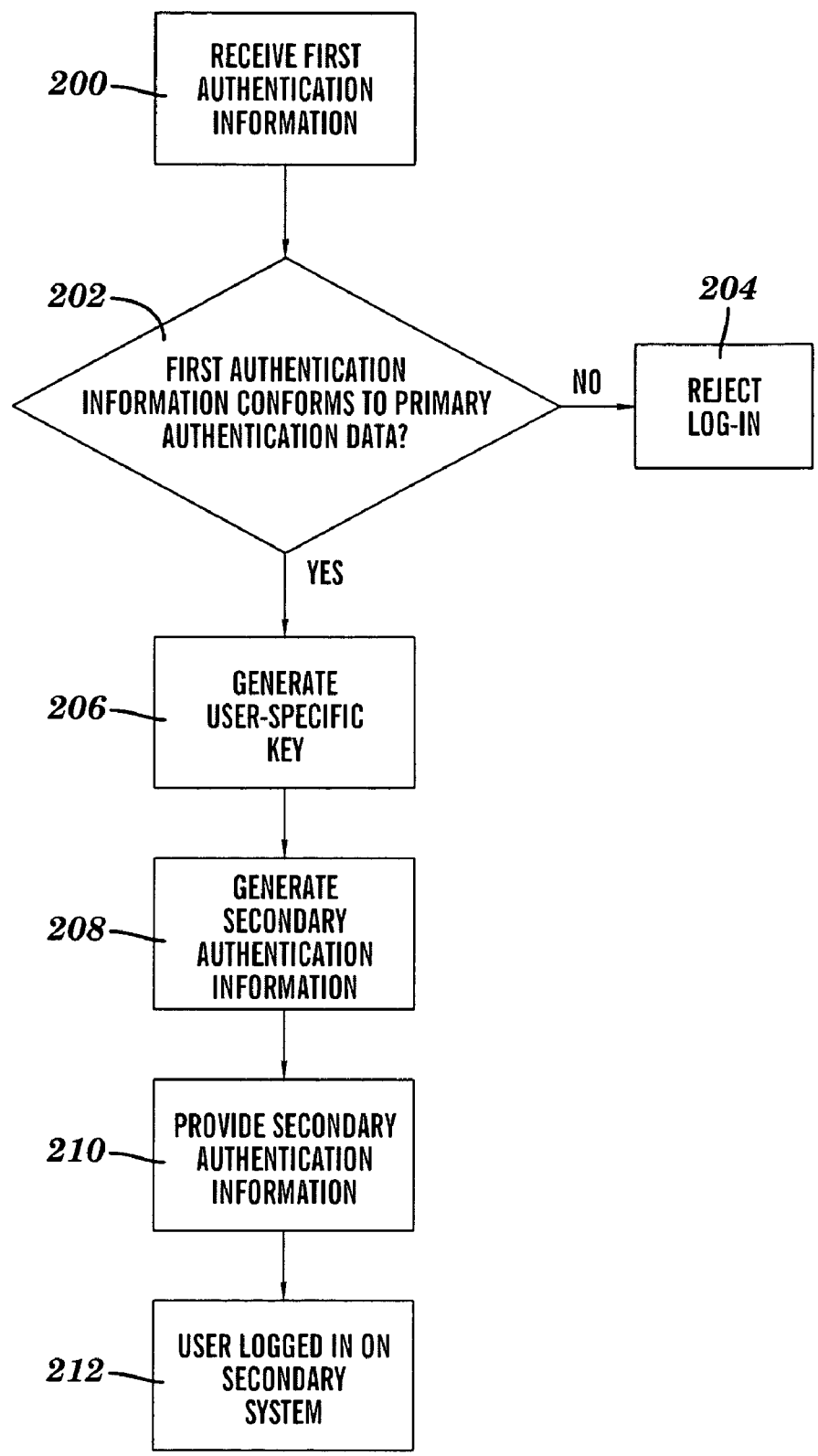
FIG. 2 is a flow diagram for performing a method, in accordance with the invention, in accordance with embodiments of the present invention.

FIG. 2 depicts a flow diagram for performing a method, in accordance with embodiments of the present invention. The method may be performed by the computer program product 136 in the primary system 104 of FIG. 1. In step 200, a first authentication information 120 is received from a user requesting access to the primary system 106. In step 202, the generated function of the first authentication information 120 is checked for conformance against the primary authentication data 126 which is stored in the credential store 106 of the primary system 104. If step 202 determines that there is a difference between the primary authentication data 126 and the generated function of the first authentication information 120, then the user is rejected in step 204. If step 202 determines that there is no difference between the primary authentication data 126 and the first authentication information 120, then the method proceeds with step 206, wherein a user-specific key 138 is generated from the first authentication information 120, as described in FIG. 5.

Figure 5:
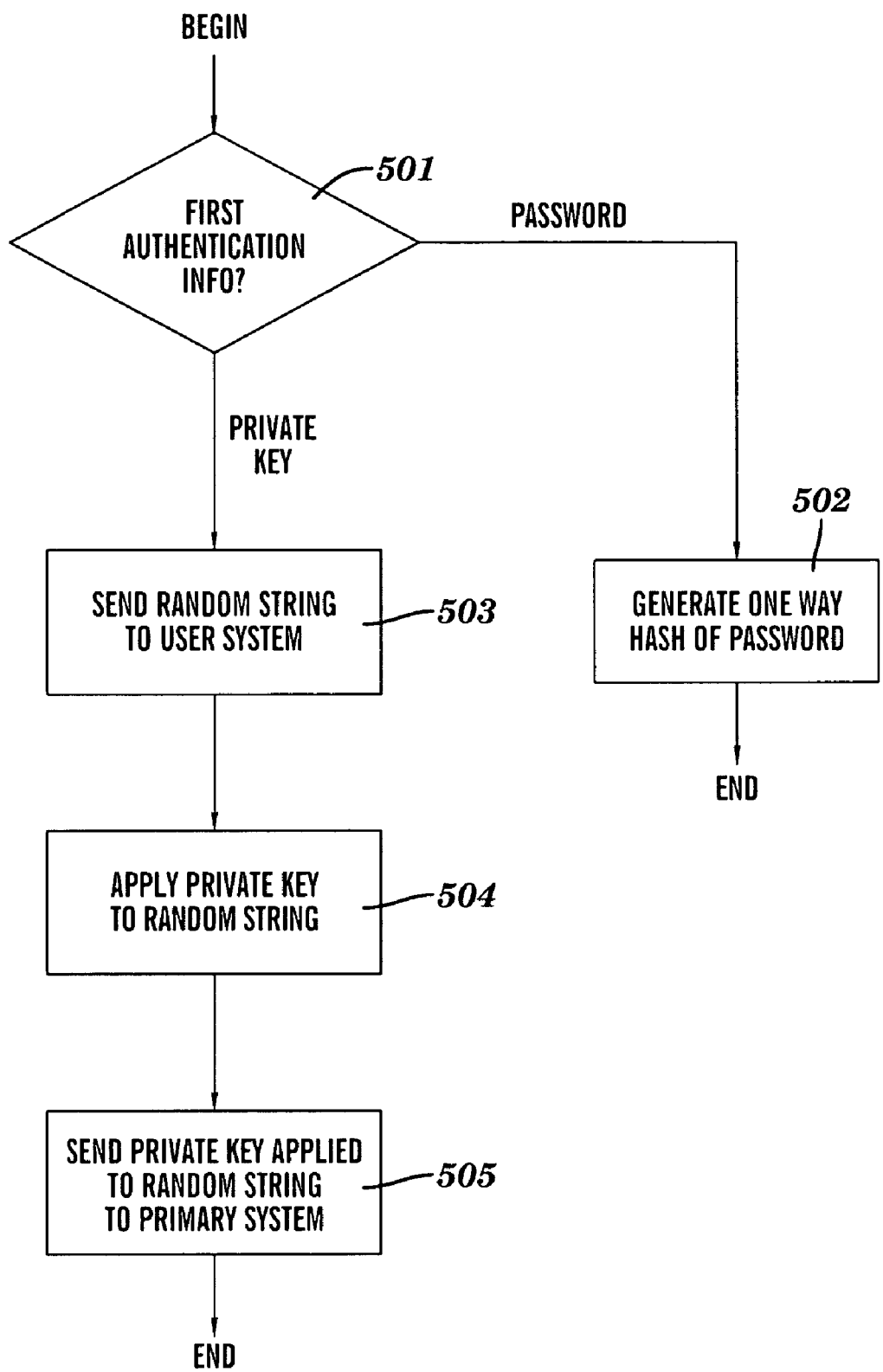
FIG. 5 is a flow chart describing generation of a user-specific key, in accordance with embodiments of the present invention.

FIG. 5 is a flow chart describing generation of a user-specific key, in accordance with embodiments of the present invention. Step 501 determines if the first authentication information 120 is a password or is derived from a private key.

If step 501 determines that the first authentication information 120 is a password, then the primary system 104 generates the user-specific key as a one-way hash of the password via the second encryption method described supra. If step 501 determines that the first authentication information 120 is derived from a private key, then: in step 503 the primary system 104 sends a random string to the user system 102; in step 504 the user system 102 applies the private key to the random string; and in step 505 the user system 102 sends to the primary system 104 the private key applied to the random string as the user-specific key. Note the user specific key is "user-specific" because the user specific key is a function of user data that is specific to the user, namely the user data of the user's password or the user's private key.

In step 208 of FIG. 2, a secondary authentication information 140 is generated by decryption of the secondary authentication data 128 by use of the user-specific key 138. The secondary authentication information 140 is provided to the secondary system 108 in step 210 so that in step 212 the user is logged on the secondary system 108.

Figures 3, 4:
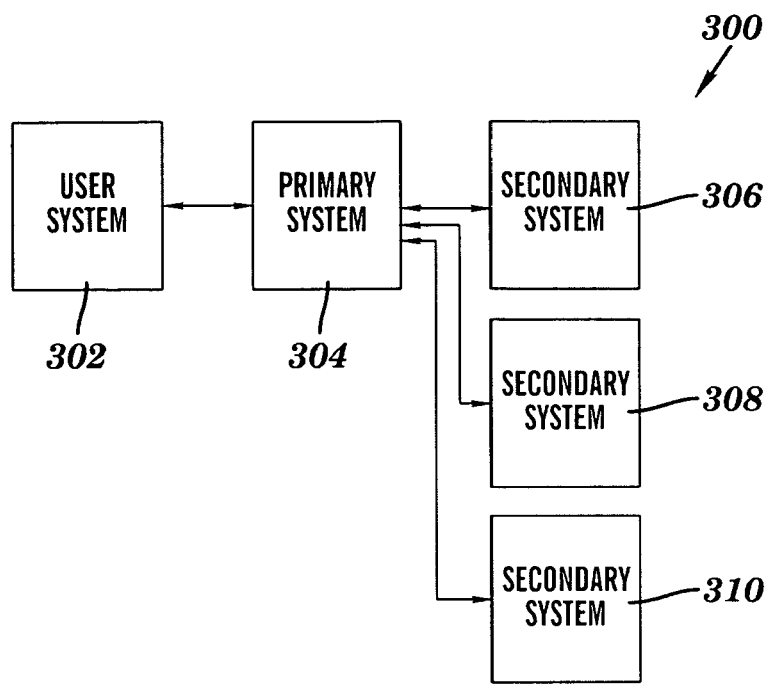
FIG. 3 is a block diagram of a computer network of an access management system, in accordance with embodiments of the present invention.
FIG. 4 is a table illustrating use of the access management system of FIG. 3, in accordance with embodiments of the present invention.

FIG. 3 shows a block diagram of a computer network 300 of an access management system, in accordance with embodiments of the present invention. The computer network 300 comprises a user system 302, a primary system 304, and three secondary systems: secondary system 306, secondary system 308, and secondary system 310.

FIG. 4 is a table 312 illustrating use of the access management system of FIG. 3, in accordance with embodiments of the present invention. The table 312 comprises a list of users which can access the secondary systems 306, 308, and 310 from the primary system 304 along with information about how the primary system 304 and the secondary system 306, 308, and 310 are accessed. The primary system 304 represents the primary system 104 of FIG. 1. The secondary systems 306, 308, and 310 each represent the secondary system 108 of FIG. 1.

In line 314, the user name is Frank A. Frank A uses the password "my99sec" to authenticate himself against the primary system 304. As shown in the second column of line 314, the password "my99sec", which is the first authentication information 120, is one way encrypted by the first hash function H_a and then compared with the primary authentication data 126 stored in the credential store 106. Frank A can access the primary system 304 if the hash function H_a applied to the password "my99sec" provided by Frank A is equal to the primary authentication data 126. In order to access the secondary systems 306, 308 or 310, a user-specific key 138 is generated by use of the password "my99sec". This is done as shown in the third column of line 314 by one way encrypting the password "my99sec" with a second hash function H_b. The user-specific key 138 is then H_b(my99sec). The secondary authentication information 140 of each secondary system, 306, 308, or 310, is then generated by two way encryption of the secondary authentication data 128 of each secondary system 306, 310, or 310, respectively. The two way encryption function is E(H_b(my99sec)) in which the functional value of H_b(my99sec) is used as an argument (i.e. as key). Thus by two way encryption of the secondary authentication data 128 of the secondary system 306, the secondary authentication information 140 "mypass" is generated. By two way encryption of the secondary authentication data 128 of the secondary system 308, the secondary authentication information 140 "0607" is generated. By two way encryption of the secondary authentication data of the secondary system 310, the secondary authentication information 140 "frank99" is generated.

In line 316, the user name is Ann B. Ann B uses the password "ysxjik" to authenticate herself against the primary system 304. As shown in the second column of line 316, the password "ysxjik", which is the first authentication information 120, is one way encrypted by the first hash function H_a and then compared with the primary authentication data 126 stored in the credential store 106. Ann B can access the primary system 304 if the hash function H_a applied to the password "ysxjik" provided by Anne B is equal to the primary authentication data 126. In order to access on of the secondary systems 306, 308 or 310, a user-specific key 138 is generated by use of the password "ysxjik". This is done as shown in the third column of line 314 by one way encrypting the password "ysxjik" with a second hash function H_b. The user-specific key 138 is then H_b(ysxjik). The secondary authentication information 140 of each secondary system, 306, 308, or 310, is then generated by two way encryption of the secondary authentication data 128 of each secondary system 306, 310, or 310, respectively. The two way encryption function is E(H_b(ysxjik)) in which the functional value of H_b(ysxjik) is used as an argument (i.e. as key). Thus by two way encryption of the secondary authentication data 128 of the secondary system 306, the secondary authentication information 140 "asdl" is generated. By two way encryption of the secondary authentication data 128 of the secondary system 308, the secondary authentication information 140 "m&m" is generated. By two way encryption of the secondary authentication data 128 of the secondary system 310, the secondary authentication information 140 "summer05" is generated.

In line 318, the user name is Nicole C. Nicole C uses the password "nic8ole" to authenticate herself against the primary system 304. As shown in the second column of line 318, the password "nic8ole", which is the first authentication information 120, is one way encrypted by the first hash function H_a and then compared with the primary authentication data 126 stored in the credential store 106. Nicole C can access the primary system 304 if the hash function H_a applied to the password "nic8ole" provided by Nicole C is equal to the primary authentication data 126. In order to access on of the secondary systems 306, 308 or 310, a user-specific key 138 is generated by use of the password "nic8ole". This is done as shown in the third column of line 314 by one way encrypting the password "nic8ole" with a second hash function H_b. The user-specific key 138 is then H_b(nic8ole). The secondary authentication information 140 of each secondary system, 306, 308, or 310, is then generated by two way encryption of the secondary authentication data 128 of each secondary system 306, 310, or 310, respectively. The two way encryption function is E(H_b(nic8ole)) in which the functional value of H_b(nic8ole) is used as an argument (i.e. as key). Thus by two way encryption of the secondary authentication data 128 of the secondary system 306, the secondary authentication information 140 "n1ccy" is generated. By two way encryption of the secondary authentication data 128 of the secondary system 308, the secondary authentication information 140 "mace04" is generated. By two way encryption of the secondary authentication data 128 of the secondary system 310, the secondary authentication information 140 "imhoidbi" is generated.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for controlling access of a user to a secondary system, said user being logged on a user system, a primary system connecting the user system to the secondary system, said method comprising:
    said primary system receiving first authentication information from the user system;
    said primary system determining that a decryption or an encryption of the first authentication information is equal to protected primary authentication data stored in the primary system, followed by said primary system providing access of the user to the primary system;
    after said providing access of the user to the primary system, said primary system generating a user-specific key consisting of either the first authentication information or an encryption of the first authentication information;
    said primary system generating second authentication information from protected secondary authentication data stored in the primary system, said generating the second authentication information comprising using applying the user-specific key to the protected secondary authentication data to generate the second authentication information; and
    said primary system providing the second authentication information to the secondary system to enable access of the user to the secondary system,
    wherein the method further comprises:
        said primary system sending a random string to the user system, wherein the random string is derived from user-specific data pertaining to the user; and
        responsive to said sending the random string, said primary system receiving from the user system an encryption of the random string by a private key of the user, wherein the first authentication information is the encryption of the random string, and wherein said generating the user-specific key comprises setting the user-specific key equal to the encryption of the random string.

2. The method of claim 1, wherein the primary system comprises an application, said application comprising a portal through which the secondary system may be accessed from the user system after access of the user to the secondary system has been enabled via said providing the second authentication information to secondary system.

3. The method of claim 1, wherein said generating the second authentication information comprises performing a decryption of the protected secondary authentication data by use of the user-specific key applied to the secondary authentication data.

4. The method of claim 1, wherein said generating the second authentication information comprises performing a two way encryption of the protected secondary authentication data by use of the user-specific key applied to the secondary authentication data.

5. The method of claim 1, wherein the method further comprises: responsive to the user logging off the primary system, deleting the user-specific key and the secondary authentication information.

6. The method of claim 1, wherein the method further comprises:
receiving second secondary authentication information from the user;
generating second protected secondary authentication data by two-way encryption of the second secondary authentication information by use of the user-specific key; and
replacing the protected secondary authentication data by the second protected secondary authentication data.

7. The method of claim 1, wherein the method further comprises:
after the user has accessed the primary system in response to said determining that said decryption or encryption of the first authentication information is equal to the protected primary authentication data, receiving a request from the user to change the protected primary authentication data;
requesting second primary authentication information from the user;
transforming the second primary authentication information into second protected primary authentication data;
replacing the protected primary authentication data by the second protected primary authentication data;
generating second secondary authentication data by two-way encrypting the secondary authentication information by use of the second primary authentication information; and
replacing the secondary authentication data by the second secondary authentication data.

8. The method of claim 1, wherein the method further comprises storing the user-specific key in the primary system.

9. The method of claim 1, wherein the primary system comprises a credential store, and wherein the credential store comprises the protected primary authentication data and the protected secondary authentication data.

10. A computer program product comprising a computer readable storage device storing computer executable instructions that when executed by a processor of a primary system perform a method for controlling access of a user to a secondary system, said user being logged on a user system, said primary system connecting the user system to the secondary system, said method comprising:
said primary system receiving first authentication information from the user system;
said primary system determining that a decryption or an encryption of the first authentication information is equal to protected primary authentication data stored in the primary system, followed by said primary system providing access of the user to the primary system;
after said providing access of the user to the primary system, said primary system generating a user-specific key consisting of either the first authentication information or an encryption of the first authentication information;
said primary system generating second authentication information from protected secondary authentication data stored in the primary system, said generating the second authentication information comprising applying the user-specific key to the protected secondary authentication data to generate the second authentication information; and
said primary system providing the second authentication information to the secondary system to enable access of the user to the secondary system,
wherein the method further comprises:
said primary system sending a random string to the user system, wherein the random string is derived from user-specific data pertaining to the user; and
responsive to said sending the random string, said primary system receiving from the user system an encryption of the random string by a private key of the user, wherein the first authentication information is the encryption of the random string, wherein said determining that said decryption or encryption of the first authentication information is equal to the protected primary authentication data comprises decrypting the first authentication information by use of a public key that is associated with the private key followed by determining that the decrypted first authentication information is equal to the protected primary authentication data, and wherein said generating the user-specific key comprises setting the user-specific key equal to the encryption of the random string.

11. The computer program product of claim 10, wherein the primary system comprises an application, said application comprising a portal through which the secondary system may be accessed from the user system after access of the user to the secondary system has been enabled via said providing the second authentication information to secondary system.

12. The computer program product of claim 10, wherein said generating the second authentication information comprises performing a decryption of the protected secondary authentication data by use of the user-specific key applied to the secondary authentication data.

13. The computer program product of claim 10, wherein said generating the second authentication information comprises performing a two way encryption of the protected secondary authentication data by use of the user-specific key applied to the secondary authentication data.

14. The computer program product of claim 10, wherein the method further comprises: responsive to the user logging off the primary system, deleting the user-specific key and the secondary authentication information.

15. The computer program product of claim 10, wherein the method further comprises:
receiving second secondary authentication information from the user;
generating second protected secondary authentication data by two-way encryption of the second secondary authentication information by use of the user-specific key; and
replacing the protected secondary authentication data by the second protected secondary authentication data.

16. The computer program product of claim 10, wherein the method further comprises:
after the user has accessed the primary system in response to said determining that said decryption or encryption of the first authentication information is equal to the protected primary authentication data, receiving a request from the user to change the protected primary authentication data;
requesting second primary authentication information from the user;
transforming the second primary authentication information into second protected primary authentication data;

replacing the protected primary authentication data by the second protected primary authentication data;

generating second secondary authentication data by two-way encrypting the secondary authentication information by use of the second primary authentication information; and replacing the secondary authentication data by the second secondary authentication data.

17. A primary system comprising a processor and a computer program product, said computer program product comprising computer executable instructions that when executed by the processor perform a method for controlling access of a user to a secondary system when the user is logged on a user system subject to the primary system connecting the user system to the secondary system, said method comprising:

said primary system receiving first authentication information from the user system;

said primary system determining that a decryption or an encryption of the first authentication information is equal to protected primary authentication data stored in the primary system, followed by said primary system providing access of the user to the primary system;

after said providing access of the user to the primary system, said primary system generating a user-specific key consisting of either the first authentication information or an encryption of the first authentication information;

said primary system generating second authentication information from protected secondary authentication data stored in the primary system, said generating the second authentication information comprising applying the user-specific key to the protected secondary authentication data to generate the second authentication information; and said primary system providing the second authentication information to the secondary system to enable access of the user to the secondary system, wherein the method further comprises:

said primary system sending a random string to the user system, wherein the random string is derived from user-specific data pertaining to the user; and responsive to said sending the random string, said primary system receiving from the user system an encryption of the random string by a private key of the user, wherein the first authentication information is the encryption of the random string, and wherein said generating the user-specific key comprises setting the user-specific key equal to the encryption of the random string.

18. The primary system of claim 17, wherein the primary system comprises an application, said application comprising a portal through which the secondary system may be accessed from the user system after access of the user to the secondary system has been enabled via said providing the second authentication information to secondary system.

19. The primary system of claim 17, wherein said generating the second authentication information comprises performing a decryption of the protected secondary authentication data by use of the user-specific key applied to the secondary authentication data.

20. The primary system of claim 17, wherein said generating the second authentication information comprises performing a two way encryption of the protected secondary authentication data by use of the user-specific key applied to the secondary authentication data.

21. The primary system of claim 17, wherein the method further comprises: responsive to the user logging off the primary system, deleting the user-specific key and the secondary authentication information.

22. The primary system of claim 17, wherein the method further comprises:

receiving second secondary authentication information from the user;

generating second protected secondary authentication data by two-way encryption of the second secondary authentication information by use of the user-specific key; and replacing the protected secondary authentication data by the second protected secondary authentication data.

23. The primary system of claim 17, wherein the method further comprises:

after the user has accessed the primary system in response to said determining that said decryption or encryption of the first authentication information is equal to the protected primary authentication data, receiving a request from the user to change the protected primary authentication data;

requesting second primary authentication information from the user;

transforming the second primary authentication information into second protected primary authentication data;

replacing the protected primary authentication data by the second protected primary authentication data;

generating second secondary authentication data by two-way encrypting the secondary authentication information by use of the second primary authentication information; and replacing the secondary authentication data by the second secondary authentication data.

* * * * *